US010606071B1

(12) United States Patent
Trail et al.

(10) Patent No.: US 10,606,071 B1
(45) Date of Patent: Mar. 31, 2020

(54) LIGHTFIELD WAVEGUIDE INTEGRATED EYE TRACKING

(71) Applicant: Facebook Technologies, LLC, Menlo Park, CA (US)

(72) Inventors: Nicholas Daniel Trail, Bothell, WA (US); Douglas Robert Lanman, Bellevue, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 3 days.

(21) Appl. No.: 16/195,442

(22) Filed: Nov. 19, 2018

Related U.S. Application Data

(63) Continuation of application No. 15/842,020, filed on Dec. 14, 2017, now Pat. No. 10,168,531.

(60) Provisional application No. 62/442,287, filed on Jan. 4, 2017.

(51) Int. Cl.
G02B 27/00 (2006.01)
G02B 27/01 (2006.01)

(52) U.S. Cl.
CPC ..... G02B 27/0093 (2013.01); G02B 27/0172 (2013.01); G02B 2027/014 (2013.01); G02B 2027/0178 (2013.01)

(58) Field of Classification Search
CPC ............ G02B 27/0093; G02B 27/0172; G02B 2027/014; G02B 2027/0178
See application file for complete search history.

(56) References Cited

U.S. PATENT DOCUMENTS

| 8,878,749 | B1 | 11/2014 | Wu et al. |
| 9,335,548 | B1 | 5/2016 | Cakmakci et al. |
| 9,377,623 | B2 | 6/2016 | Robbins et al. |
| 2003/0012425 | A1 | 1/2003 | Suzuki et al. |
| 2010/0149073 | A1 | 6/2010 | Chaum et al. |
| 2011/0109880 | A1 | 5/2011 | Nummela |
| 2014/0184775 | A1 | 7/2014 | Drake et al. |
| 2015/0185475 | A1 | 7/2015 | Saarikko et al. |
| 2015/0289762 | A1 | 10/2015 | Popovich et al. |
| 2016/0085300 | A1 | 3/2016 | Robbins et al. |
| 2016/0139402 | A1 | 5/2016 | Lapstun |
| 2018/0232048 | A1 | 8/2018 | Popovich et al. |
| 2018/0275410 | A1 | 9/2018 | Yeoh et al. |

Primary Examiner — Abhishek Sarma
(74) Attorney, Agent, or Firm — Fenwick & West LLP

(57) ABSTRACT

An eye tracker for determining a position of an eye, which may be integrated into a head-mounted display. The eye tracker includes at least one waveguides with an array of grating structures, an array of light sources, a detector, and a controller. The controller activates at least one light source at a time to emit at least one light beam that propagates through the at least one waveguide and couple out via the array of grating structures towards a user's eye. Light signals reflected from the user's eye and skin surfaces are coupled into the at least one waveguide and propagate to the detector that captures the reflected light signals. The controller calculates magnitudes of the reflected light signals to obtain a signature of converted light signals, and determines a position and orientation of the user's eye based on the signature of converted light signals.

20 Claims, 6 Drawing Sheets

600

```
┌─────────────────────────────────────────┐
│ Instruct one or more light sources in    │
│ an array of light sources coupled to     │
│ one or more waveguides to emit one or    │
│ more light beams that propagate through  │
│ the one or more waveguides               │
│ 610                                      │
└─────────────────────────────────────────┘
                    ↓
┌─────────────────────────────────────────┐
│ Out-couple the one or more light beams   │
│ towards an eye-box via an array of       │
│ diffraction elements that populate the   │
│ one or more waveguides                   │
│ 620                                      │
└─────────────────────────────────────────┘
                    ↓
┌─────────────────────────────────────────┐
│ In-couple a plurality of light signals   │
│ into one or more waveguides              │
│ 630                                      │
└─────────────────────────────────────────┘
                    ↓
┌─────────────────────────────────────────┐
│ Propagate, via the one or more           │
│ waveguides, the plurality of reflected   │
│ light signals to a detector              │
│ 640                                      │
└─────────────────────────────────────────┘
                    ↓
┌─────────────────────────────────────────┐
│ Capture the plurality of reflected light │
│ signals propagated through the one or    │
│ more waveguides                          │
│ 650                                      │
└─────────────────────────────────────────┘
                    ↓
┌─────────────────────────────────────────┐
│ Calculate, based on the captured         │
│ plurality of reflected light signals,    │
│ magnitudes of the plurality of reflected │
│ light signals to obtain a signature of   │
│ converted light signals                  │
│ 660                                      │
└─────────────────────────────────────────┘
                    ↓
┌─────────────────────────────────────────┐
│ Determine an orientation and a position  │
│ of a user's eye in the eye-box based on  │
│ the signature of converted light signals │
│ 670                                      │
└─────────────────────────────────────────┘
```

FIG. 6

LIGHTFIELD WAVEGUIDE INTEGRATED EYE TRACKING

CROSS-REFERENCE TO RELATED APPLICATIONS

This application is a continuation of co-pending U.S. application Ser. No. 15/842,020, filed Dec. 14, 2017, which claims the benefit of U.S. Provisional Patent Application Ser. No. 62/442,287, filed Jan. 4, 2017, which is hereby incorporated by reference in its entirety.

BACKGROUND

The present disclosure generally relates to eye tracking in virtual reality systems, and specifically relates to light-field waveguide integrated eye tracking.

For further development of artificial reality systems, eye tracking serves as a necessary technology advancement that can facilitate providing information related to user's interaction and gaze direction. With efficient implementation of eye tracking, artificial reality systems can focus on aspects that are directly related to a visual experience of an end-user. Based on information related to a position and orientation of a user's eye in an eye-box, a maximum pixel density (in a traditional display vernacular) may need to be provided only in a foveal region of the user's gaze, while a lower pixel resolution can be used in other regions leading to savings in power consumption and computing cycles. The resolution of pixel density can be reduced in non-foveal regions either gradually or in a step-wise fashion (e.g., by over an order of magnitude per each step).

Integrating eye tracking into a small form-factor package that maintains stability and calibration can be often challenging. Traditionally, eye tracking architectures are based on an image formation through the use of a "hot mirror", or by utilizing devices that work based on substantially similar methods. When the "hot mirror" approach is employed, an imaging device (camera) receives light that reflects off the "hot mirror" to image a user's eye-box. The light was originally emitted by a (typically) infrared (IR) light source, e.g., IR light emitting diodes (LEDs) encircling the viewing optics. In the imaging approach, this provides a path for the camera to image the eye-box region of the device, which will allow one or more surfaces of a user's eye to be imaged and correlated to a gaze direction. The image formed by the camera may identify various features of the eye, including light reflected by any visible surface, such as the anterior and posterior corneal surfaces, the pupil, the iris, the sclera, and eyebrows, eyelashes, and other facial features. Internal structures may also be observed by the camera, including reflections from the retina or the anterior or posterior crystalline lens surfaces. Eye tracking algorithms typically use a model-based approach, where these features are identified and used to refine the model parameters and, correspondingly, estimate the state of the eye, including its position and orientation with respect to a head-mounted display. In an alternative configuration, the hot-mirror can also be used in a non-imaging configuration, avoiding the need to process and use image(s) of the one or more surfaces of the user's eye. This can be achieved, for example, based on correlating an eye-gaze coordinate with a maximized "red-eye" light signal, which is maximized around the foveal location due to the so-called "foveal reflex."

However, implementing the hot-mirror based eye-tracking, whether imaging or non-imaging, into a small package that maintains stability and calibration is challenging. Therefore, more efficient methods for eye-tracking are desired for implementation in artificial reality systems.

SUMMARY

Embodiments of the present disclosure support a waveguide based eye tracker for implementation in artificial reality systems. The presented waveguide-based eye tracker includes a plurality of grating structures, such as surface relief or holographic, one or more waveguides, an array of infra-red (IR) light sources, and a detector array. Each light source in the array of light sources can be a point source that emits light, and an array of point sources forms a light bar interfaced with the waveguide. The light emitted from each light source is coupled into the one or more waveguides and propagates through the one or more waveguides. The light can be out coupled from the one or more waveguides towards a user's eye via one or more of the grating structures. Depending on an orientation of the user's eye relative to the emitted IR light, some of the IR light is reflected back towards the one or more waveguides, which couples into the one or more waveguides and propagates to the detector array. Maximum reflection occurs when the eye (i.e., fovea) is looking directly at a location emitting the IR light. A controller coupled to the detector array captures the reflected signals of interest to determine a position and orientation of the eye and a position of the eye in an eye-box. The controller determines the position and orientation of the eye based on calculating relative signals measured from the incident IR light on the eye, which form an approximation to an illumination light field, in that the waveguide based eye tracker controls both position and angular extent of the illumination field across the eye-box.

In some embodiments, an eye tracker includes one or more waveguides, wherein each of the one or more waveguides comprises an array of grating structures, an array of light sources coupled to the one or more waveguides, a detector coupled to the one or more waveguides, and a controller, interfaced with the array of light sources and the detector. The controller activates one or more light sources at a time to emit one or more light beams that propagate through the one or more waveguides and couple out via the array of grating structures towards a user's eye. Light signals reflected from the user's eye and skin surfaces are coupled into the one or more waveguides and propagate to the detector that captures the reflected light signals. The controller calculates, based on the reflected light signals captured by the detector, magnitudes of the reflected light signals to obtain a signature of converted light signals. The controller determines a position and orientation of the user's eye based on the signature of converted light signals.

BRIEF DESCRIPTION OF THE DRAWINGS

FIG. 6 is a flow chart illustrating a process for light-field waveguide integrated eye tracking, in accordance with an embodiment.

Figure 1:
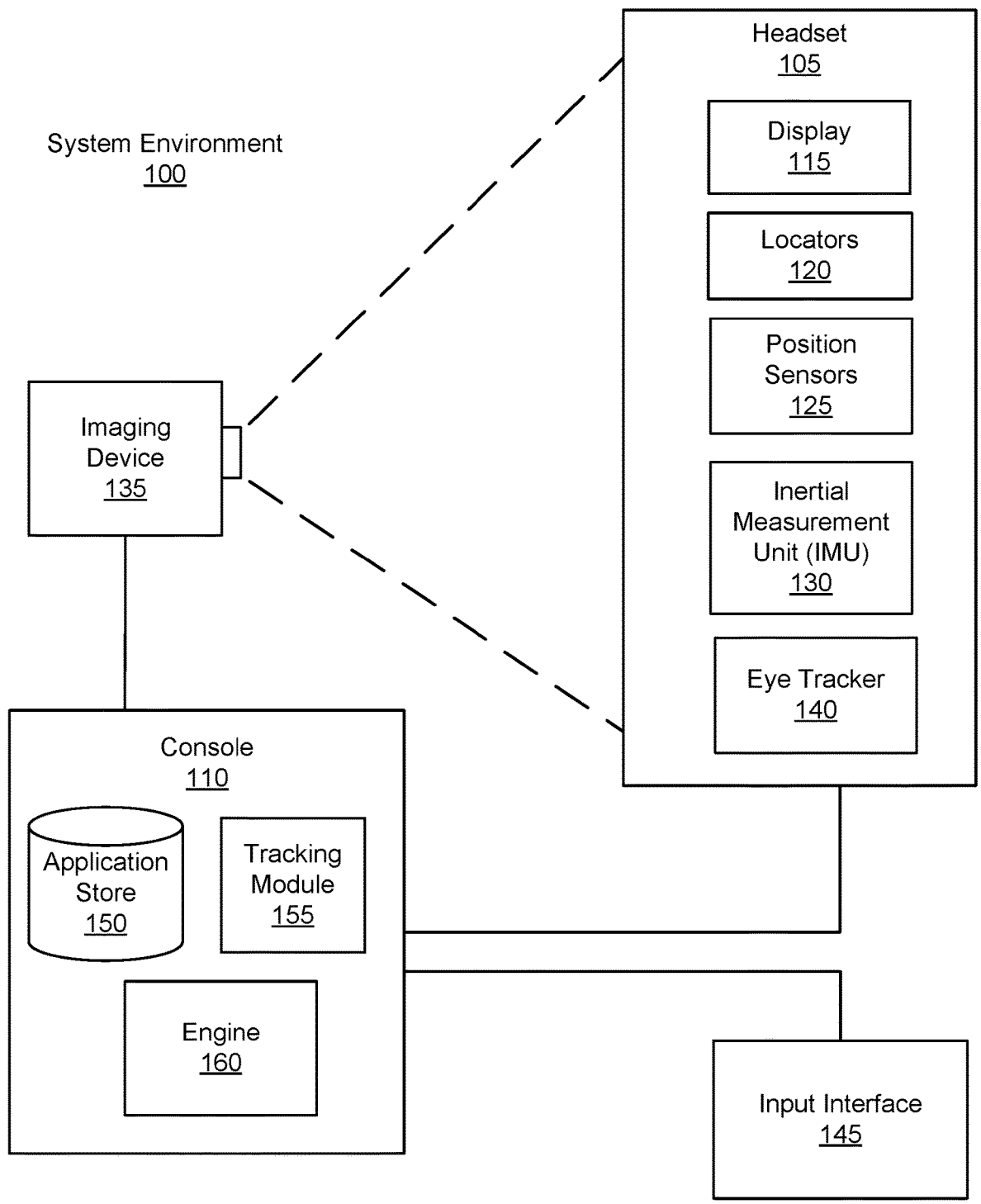
FIG. 1 is a block diagram of a system environment, in accordance with an embodiment.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Embodiments of the present disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

Disclosed embodiments include methods and apparatus for light-field waveguide integrated eye tracking in a HMD. The HMD may be part of an artificial reality system. Because the implementation of eye tracking presented herein is based on employing one or more waveguides, performance accuracy of eye tracking is preserved or even improved compared to traditional methods based on "hot mirror" with similar constraints, while achieving a smaller package size and overall lower weight. In accordance with embodiments of the present disclosure, as discussed in detail below, one or more light beams emitted from one or more light sources coupled to the one or more waveguides can be bounced around within the waveguides to couple out via one or more grating structures to an eye-box of a user, reflect from at least one surface of an eye in the eye-box and couple back into the one or more waveguides to be captured by a remote detection system interfaced with the one or more waveguides. Relative magnitudes of the reflected light signals captured by the detection system are directly related to an orientation of the eye and a position of the eye in the eye-box. An eye-box can be defined as a region where an entrance pupil of a human eye can be located to perceive an acceptable quality image produced by viewing optics. The eye-box is a three-dimensional region and is determined by the construction of the viewing optics and the placement of the HMD relative to the user's eye. Parameters of the eye-box include a lateral extent of the eye-box at a nominal eye relief of the HMD, i.e., the distance between the anterior surface of the cornea ("vertex distance") and the front surface of the HMD viewing optics. The eye tracking method presented herein is based on monitoring light reflections from at least one surface of the user's eye in the eye-box, wherein out-coupling a light from one or more waveguides towards the user's eye can be achieved via grating structures populated on the one or more waveguides. Regarding the relation between a magnitude of a reflected signal and an orientation of the user's eye as well as a position of the user's eye in the eye-box, the presented method of eye tracking can be related to the "red-eye" based methods, where the returned "red light" is at a maximum level when the user is both accommodated and aimed at a camera/light plane.

System Overview

FIG. 1 is a block diagram of a system environment 100 in which a console 110 operates. The system environment 100 shown by FIG. 1 comprises a headset 105 (also referred to as an HMD), an imaging device 135, and an input interface 145 that are each coupled to the console 110. While FIG. 1 shows an example system 100 including one headset 105, one imaging device 135, and one input interface 145, in other embodiments any number of these components may be included in the system 100. For example, there may be multiple headsets 105 each having an associated input interface 145 and being monitored by one or more imaging devices 135, with each headset 105, input interface 145, and imaging devices 135 communicating with the console 110. In alternative configurations, different and/or additional components may be included in the system environment 100. The system 100 may operate in an artificial reality system environment.

The headset 105 is a head-mounted display that presents media to a user. Examples of media presented by the headset 105 include one or more images, video, audio, or some combination thereof. In some embodiments, audio is presented via an external device (e.g., speakers and/or headphones) that receives audio information from the headset 105, the console 110, or both, and presents audio data based on the audio information. An embodiment of the headset 105 is further described below in conjunction with FIGS. 2A and 2B. The headset 105 may comprise one or more rigid bodies, which may be rigidly or non-rigidly coupled to each other together. A rigid coupling between rigid bodies causes the coupled rigid bodies to act as a single rigid entity. In contrast, a non-rigid coupling between rigid bodies allows the rigid bodies to move relative to each other. In some embodiments, the headset 105 may present an artificial reality to a user. In the VR, AR and/or MR embodiments, the headset 105 augments views of a physical, real-world environment with computer-generated elements (e.g., images, video, sound, etc.).

The headset 105 includes a display 115, one or more locators 120, one or more position sensors 125, an inertial measurement unit (IMU) 130, and an eye tracker 140.

The display 115 displays images to the user in accordance with data received from the console 110. In some embodiments, the display 115 includes a display block and an optics block. The display block includes an electronic display, and the optics block includes one or more optical elements that transmit images from the display block to eyes of the user. In some embodiments, some or all of the functionality of the display block is part of the optics block or vice versa. In some embodiments, the display 115 can be configured to adjust the focus of the image light.

The locators 120 are objects located in specific positions on the headset 105 relative to one another and relative to a specific reference point on the headset 105. A locator 120 may be a light emitting diode (LED), a corner cube reflector, a reflective marker, a type of light source that contrasts with an environment in which the headset 105 operates, or some combination thereof. In embodiments where the locators 120 are active (i.e., an LED or other type of light emitting device), the locators 120 may emit light in the visible band (~380 nm to 750 nm), in the infrared (IR) band (~750 nm to 2,000 nm), in the ultraviolet band (~250 nm to 380 nm), some other portion of the electromagnetic spectrum, or some combination thereof.

In some embodiments, the locators 120 are located beneath an outer surface of the headset 105, which is transparent to the wavelengths of light emitted or reflected by the locators 120 or is thin enough to not substantially attenuate the wavelengths of light emitted or reflected by the locators 120. Additionally, in some embodiments, the outer surface or other portions of the headset 105 are opaque in the visible band of wavelengths of light. Thus, the locators 120 may emit light in the IR band under an outer surface that is transparent in the IR band but opaque in the visible band.

The IMU 130 is an electronic device that generates fast calibration data based on measurement signals received from one or more of the position sensors 125. A position sensor 125 generates one or more measurement signals in response to motion of the headset 105. Examples of position sensors 125 include: one or more accelerometers, one or more gyroscopes, one or more magnetometers, another suitable type of sensor that detects motion, a type of sensor used for error correction of the IMU 130, or some combination thereof. The position sensors 125 may be located external to the IMU 130, internal to the IMU 130, or some combination thereof.

Based on the one or more measurement signals from one or more position sensors 125, the IMU 130 generates fast calibration data indicating an estimated position of the headset 105 relative to an initial position of the headset 105. For example, the position sensors 125 include multiple accelerometers to measure translational motion (forward/back, up/down, left/right) and multiple gyroscopes to measure rotational motion (e.g., pitch, yaw, roll). In some embodiments, the IMU 130 rapidly samples the measurement signals and calculates the estimated position of the headset 105 from the sampled data. For example, the IMU 130 integrates the measurement signals received from the accelerometers over time to estimate a velocity vector and integrates the velocity vector over time to determine an estimated position of a reference point on the headset 105. Alternatively, the IMU 130 provides the sampled measurement signals to the console 110, which determines the fast calibration data. The reference point is a point that may be used to describe the position of the headset 105. While the reference point may generally be defined as a point in space; however, in practice the reference point is defined as a point within the headset 105 (e.g., a center of the IMU 130).

The IMU 130 receives one or more calibration parameters from the console 110. The one or more calibration parameters are used to maintain tracking of the headset 105. Based on a received calibration parameter, the IMU 130 may adjust one or more IMU parameters (e.g., sample rate). In some embodiments, certain calibration parameters cause the IMU 130 to update an initial position of the reference point so it corresponds to a next calibrated position of the reference point. Updating the initial position of the reference point as the next calibrated position of the reference point helps reduce accumulated error associated with the determined estimated position. The accumulated error, also referred to as drift error, causes the estimated position of the reference point to "drift" away from the actual position of the reference point over time.

The imaging device 135 generates slow calibration data in accordance with calibration parameters received from the console 110. Slow calibration data includes one or more images showing observed positions of the locators 120 that are detectable by the imaging device 135. The imaging device 135 may include one or more cameras, one or more video cameras, any other device capable of capturing images including one or more of the locators 120, or some combination thereof. Additionally, the imaging device 135 may include one or more optical filters (e.g., used to increase signal to noise ratio). The imaging device 135 is configured to detect light emitted or reflected from locators 120 in a field of view of the imaging device 135. In embodiments where the locators 120 include passive elements (e.g., a retroreflector), the imaging device 135 may include a light source that illuminates some or all of the locators 120, which retro-reflect the light towards the light source in the imaging device 135. Slow calibration data is communicated from the imaging device 135 to the console 110, and the imaging device 135 receives one or more calibration parameters from the console 110 to adjust one or more imaging parameters (e.g., focal length, focus, frame rate, International Standards Organization (ISO) rate, sensor temperature, shutter speed, aperture, etc.).

The eye tracker 140 determines and tracks an orientation of a user's eye, a position of the eye in an eye-box, and, optionally, other eye state parameters. In some embodiments, the eye tracker 140 determines and tracks a three-dimensional (3D) orientation of the eye and a 3D position of the eye in the eye-box. In alternate embodiments, the eye tracker 140 determines and tracks some subsets of the 3D eye orientation and 3D eye position. The eye tracker 140 includes one or more waveguides, each waveguide comprising an array or field of diffraction elements or cells (e.g., grating structures), light sources, a detector, and a controller. Light emitted from the light sources is coupled into the waveguide and propagates through the waveguide until the light is out coupled from the one or more waveguides toward the user's eye and user's eye-box via the field of diffraction elements. The one or more waveguides of the eye tracker 140 further couple into and propagate light reflected from the eye-box, whereas the detector of the eye tracker 140 captures the reflected light and converts the reflected light into light signals of various intensities. The controller of the eye tracker 140 coupled to the detector determines a position and orientation of the user's eye by calculating a light field of intensities of the reflected and captured light signals. More details about the eye tracker 140 are disclosed herein in relation to FIGS. 3-6.

The input interface 145 is a device that allows a user to send action requests to the console 110. An action request is a request to perform a particular action. For example, an action request may be to start or end an application or to perform a particular action within the application. The input interface 145 may include one or more input devices. Example input devices include: a keyboard, a mouse, a game controller, or any other suitable device for receiving action requests and communicating the received action requests to the console 110. An action request received by the input interface 145 is communicated to the console 110, which performs an action corresponding to the action request. In some embodiments, the input interface 145 may provide haptic feedback to the user in accordance with instructions received from the console 110. For example, haptic feedback is provided when an action request is received, or the console 110 communicates instructions to the input interface 145 causing the input interface 145 to generate haptic feedback when the console 110 performs an action.

The console 110 provides media to the headset 105 for presentation to the user in accordance with information received from one or more of: the imaging device 135, the headset 105, and the input interface 145. In the example shown in FIG. 1, the console 110 includes an application store 150, a tracking module 155, and an engine 160. Some embodiments of the console 110 have different modules than those described in conjunction with FIG. 1. Similarly, the functions further described below may be distributed among components of the console 110 in a different manner than is described here.

The application store 150 stores one or more applications for execution by the console 110. An application is a group of instructions, that when executed by a processor, generates content for presentation to the user. Content generated by an application may be in response to inputs received from the user via movement of the headset 105 or the interface device 145. Examples of applications include: gaming applications, conferencing applications, video playback application, or other suitable applications.

The tracking module 155 calibrates the system 100 using one or more calibration parameters and may adjust one or more calibration parameters to reduce error in determination of the position of the headset 105. For example, the tracking module 155 adjusts the focus of the imaging device 135 to obtain a more accurate position for observed locators on the headset 105. Moreover, calibration performed by the tracking module 150 also accounts for information received from the IMU 130. Additionally, if tracking of the headset 105 is lost (e.g., the imaging device 135 loses line of sight of at least a threshold number of the locators 120), the tracking module 155 re-calibrates some or all of the system environment 100.

The tracking module 155 tracks movements of the headset 105 using slow calibration information from the imaging device 135. The tracking module 155 determines positions of a reference point of the headset 105 using observed locators from the slow calibration information and a model of the headset 105. The tracking module 155 also determines positions of a reference point of the headset 105 using position information from the fast calibration information. Additionally, in some embodiments, the tracking module 155 may use portions of the fast calibration information, the slow calibration information, or some combination thereof, to predict a future location of the headset 105. The tracking module 155 provides the estimated or predicted future position of the headset 105 to the engine 160.

The engine 160 executes applications within the system environment 100 and receives position information, acceleration information, velocity information, predicted future positions, or some combination thereof of the headset 105 from the tracking module 155. Based on the received information, the engine 160 determines content to provide to the headset 105 for presentation to the user. For example, if the received information indicates that the user has looked to the left, the engine 160 generates content for the headset 105 that mirrors the user's movement in a virtual environment. Additionally, the engine 160 performs an action within an application executing on the console 110 in response to an action request received from the input interface 145 and provides feedback to the user that the action was performed. The provided feedback may be visual or audible feedback via the headset 105 or haptic feedback via the input interface 145.

The engine 160 can be configured to utilize, in association with the console 110 and the headset 105, the eye tracking information obtained from the eye tracker 140 for a variety of display and interaction applications. The various applications include, but are not limited to, user interfaces (gaze-based selection), attention estimation (for user safety), gaze-contingent display modes (foveated rendering, varifocal optics, adaptive optical distortion correction, synthetic depth of field rendering), etc. In some embodiments, based on information about position of the user's eye in the eye-box, orientation of the user's eye and an angle of eye-gaze received from the eye tracker 140, the engine 160 determines resolution of the content provided to the headset 105 for presentation to the user on the display 115. The engine 160 provides the content to the headset 105 having a maximum pixel density (maximum resolution) on the display 115 in a foveal region of the user's gaze, whereas the engine 160 provides a lower pixel resolution in other regions of the display 115, thus achieving less power consumption at the headset 105 and saving computing cycles of the console 110 without compromising a visual experience of the user. In some embodiments, the engine 160 can be configured to optimize the performance of viewing optics of the headset 105, based on the eye tracking information obtained from the eye tracker 140. In one embodiment, the engine 160 can adjust optical distortion correction parameters of the viewing optics, e.g., to prevent vergence-accommodation conflict (VAC). In an alternate embodiment, the engine 160 can adjust focus of images displayed on the display 115, e.g., to prevent VAC. Additional details regarding headsets with varifocal capability are discussed in U.S. application Ser. No. 14/963,126, filed Dec. 8, 2015, U.S. application Ser. No. 14/963,109, filed Dec. 8, 2015, and are herein incorporated by reference in their entireties.

Figure 2A:
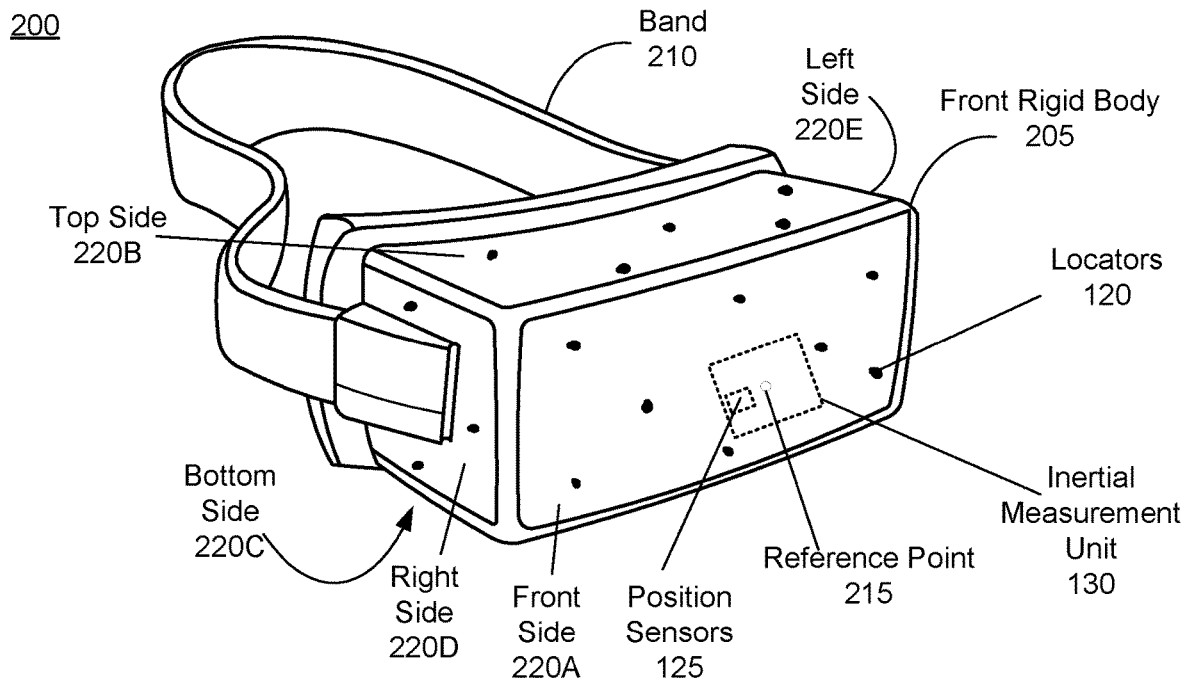
FIG. 2A is a diagram of a head-mounted display (HMD), in accordance with an embodiment.

FIG. 2A is a diagram of a HMD 200, in accordance with an embodiment. The HMD 200 may be part of an artificial reality system. In embodiments that describe AR system and/or a MR system, portions of a front side 220A of the HMD 200 are at least partially transparent in the visible band (~380 nm to 750 nm), and portions of the HMD 200 that are between the front side 220A of the HMD 200 and an eye of the user are at least partially transparent (e.g., a partially transparent electronic display). The HMD 200 is an embodiment of the headset 105, and includes a front rigid body 205, a band 210, and a reference point 215. The front rigid body 205 includes one or more electronic display elements of the display 115 (not shown in FIG. 2A), one or more eye trackers 140 (not shown in FIG. 2A), the IMU 130, the one or more position sensors 125, and the locators 120. In the embodiment shown by FIG. 2A, the position sensors 125 are located within the IMU 130, and neither the IMU 130 nor the position sensors 125 are visible to the user.

The locators 120 are located in fixed positions on the front rigid body 205 relative to one another and relative to a reference point 215. In the example of FIG. 2A, the reference point 215 is located at the center of the IMU 130. Each of the locators 120 emit light that is detectable by the imaging device 135. Locators 120, or portions of locators 120, are located on a front side 220A, a top side 220B, a bottom side 220C, a right side 220D, and a left side 220E of the front rigid body 205 in the example of FIG. 2A.

Figure 2B:
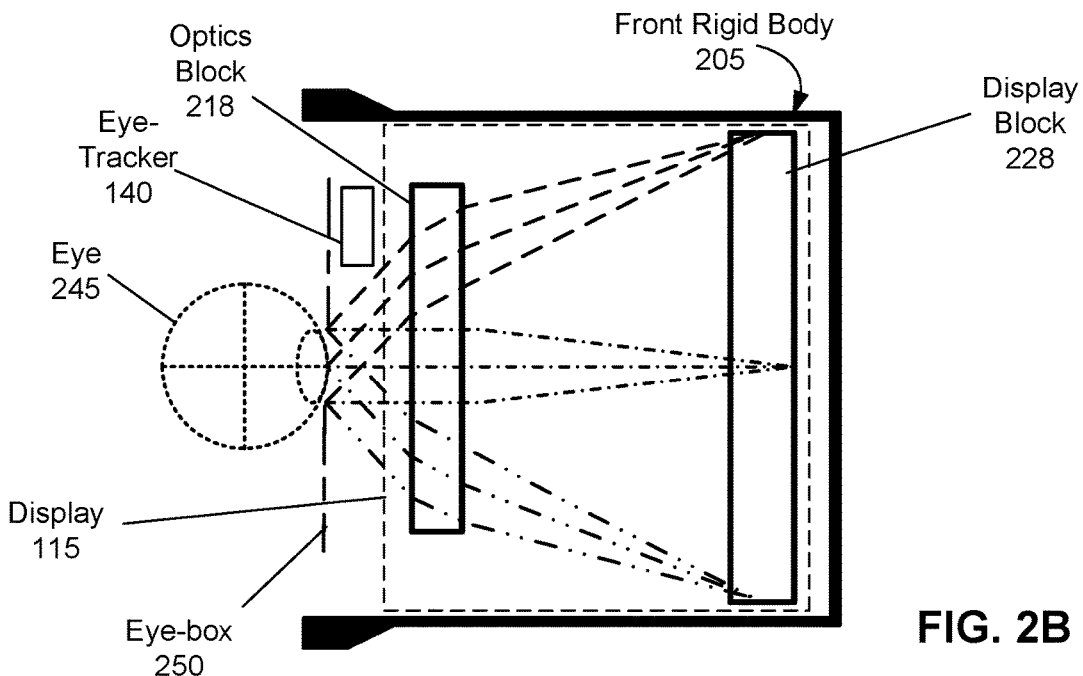
FIG. 2B is a cross section of a front rigid body of the HMD in FIG. 2A, in accordance with an embodiment.

FIG. 2B is a cross section 225 of the front rigid body 205 of the embodiment of the HMD 200 shown in FIG. 2A. As shown in FIG. 2B, the front rigid body 205 includes the display 115 that provides focus adjusted image light to an eye-box 250. The display 115 includes a display block 228 and an optics block 218. The eye-box 250 is the location of the front rigid body 205 where a user's eye 245 is positioned. For purposes of illustration, FIG. 2B shows a cross section 225 associated with a single eye 245, but another display, separate from the display 115, provides altered image light to another eye of the user.

The display block 228 generates image light. In some embodiments, the display block 228 includes an optical element that adjusts the focus of the generated image light. The display 115 displays images to the user in accordance with data received from the console 110. In various embodiments, the display 115 may comprise a single electronic display or multiple electronic displays (e.g., a display for each eye of a user). Examples of the electronic display include: a liquid crystal display (LCD), an organic light emitting diode (OLED) display, an inorganic light emitting diode (ILED) display, an active-matrix organic light-emitting diode (AMOLED) display, a transparent organic light emitting diode (TOLED) display, a waveguide-based display, some other display, a projector, or some combination thereof. The display 115 may also include an aperture, a Fresnel lens, a refractive lens including a convex or a concave lens, a filter, a polarizer, a diffuser, a fiber taper, a reflective optical element, or any other suitable optical element that affects the image light emitted from the electronic display. In some embodiments, one or more of the display block optical elements may have one or more coatings, such as anti-reflective coatings.

The optics block 218 magnifies received light from the display block 228, corrects optical aberrations associated with the image light, and the corrected image light is presented to a user of the headset 105. An optical element may be an aperture, a Fresnel lens, a refractive lens including a convex or a concave lens, a filter, a reflective optical element, a diffractive optical element, or any other suitable optical element that affects the image light emitted from the display block 228. Moreover, the optics block 218 may include combinations of different optical elements. In some embodiments, one or more of the optical elements in the optics block 218 may have one or more coatings, such as anti-reflective coatings. Magnification of the image light by the optics block 218 allows elements of the display block 228 to be physically smaller, weigh less, and consume less power than larger displays. Additionally, magnification may increase a field of view of the displayed media. For example, the field of view of the displayed media is such that the displayed media is presented using almost all (e.g., 110 degrees diagonal), and in some cases all, of the user's field of view. In some embodiments, the optics block 218 is designed so its effective focal length is larger than the spacing to the display block 228, which magnifies the image light projected by the display block 228. Additionally, in some embodiments, the amount of magnification may be adjusted by adding or removing optical elements. As shown in FIG. 2B, the front rigid body 205 further includes the eye tracker 140 placed between the user's eye 245 and the optics block 218, which determines and tracks a position and orientation of the user's eye 245. In alternate embodiments, the eye tracker 140 is placed between the optics block 218 and the display block 228 or within the optics block 218. Eye tracking information obtained by the eye tracker 140 can be used for various applications, including but not limited to foveated rendering, user interaction, synthetic depth of field rendering, adjusting optical distortion correction parameters of one or more optical elements of the optics block 218, adjusting focus of images displayed on the display block 228, etc. More details about the eye tracker 140 are disclosed herein in relation to FIGS. 3-6. Note that the embodiments shown in FIGS. 2A and 2B are not limiting to VR applications, and AR and MR applications are obvious extensions of the embodiments illustrated by FIGS. 2A and 2B.

Light-Field Waveguide Integrated Eye Tracking

Described embodiments include an eye tracking system based on a waveguide with grating structures. A grating structure is an optical component that diffracts an incoming beam of light by a specific angle depending on a design of the grating structure. When integrated into a waveguide as discussed in more detail below in conjunction with FIGS. 3-5, the grating structure out-couples a beam of light transmitted through the waveguide, i.e., diffracts the beam of light towards the user's eye. In addition, the grating structure in-couples a beam of light reflected from a surface of the user's eye into the waveguide, i.e., grating structure diffracts the incoming reflected beam of light into the waveguide. An electrically switchable Bragg grating (SBG) is an embodiment of the grating structure that can be configured to switch from an inactive mode to an active mode and vice versa based on a voltage level applied to the SBG. The SBG is in the inactive mode when the voltage level applied to the SBG is below a threshold, i.e., the SBG is then effectively turned off. The SBG is in the active mode when the voltage level applied to the SBG is above the threshold. When in the active mode, the SBG is configured to diffract light of a specific wavelength or a range of wavelengths. Thus, operation of a SBG can be controlled by applying a specific voltage level to that SBG.

In some embodiments, inclusion of Switchable Bragg Gratings (SBGs) within a waveguide for out-coupling of propagated light can drive implementation cost, controlling complexity and/or a size of an eye tracker with an integrated waveguide. Instead of employing the SBGs for out-coupling light from a waveguide of an eye tracker, the methods presented herein allow for selection of one-dimensional aspect of a user's eye-box. The approach described herein facilitates tracking of a user's eye within the eye-box based upon a sampled 'light-field' style architecture of the waveguide. A light-field represents a set of optical rays (light beams) in 3D that pass through a nominal eye-box for a HMD. This bundle of light beams can be parameters, for example, by a position and angle at which any individual light beam exits from a waveguide by the action of a specific out-coupling element (grating structure). A light-field waveguide composed of grating structures and a detector coupled to the waveguide employed herein for eye tracking are configured to capture information about intensity of light beam reflected from a surface of the user's eye as well as information about an out-coupling position on the waveguide and an out-coupling angle for a light beam ejected from the waveguide towards the user's eye. Intensity signals of light beams reflected from various surfaces of the user's eye together with out-coupling positional and angular information can be used by the detector to determine a position of the user's eye in an eye-box and an orientation of the user's eye.

A waveguide presented in this disclosure is composed of uniquely patterned and spatially separated grating structures, wherein each grating structure has a defined output angle (i.e., an angle of out-coupling light) and a defined input angle (i.e., an angle of in-coupling light). Thus, the spatial extent of the waveguide can be decomposed into a grid of otherwise unique grating structures. The grid may be square, rectangular, hexagonal or in any other configuration. Each grating structure can be independently tuned for the input/output coupling angles, across one or more wavelengths being utilized. Based upon the position of each grating structure relative to a 3D centroid of a user's eye-box, the input/output coupling angles (and, therefore, grating period and overall design) can be optimized to cover both an extent of the eye-box and a field of view that could be utilized. In addition, a size of any grating structure can be also optimized based upon its location relative to the centroid of the eye-box. For example, the grid layout of the grating structures in the waveguide may be 1×1 millimeter scale near the center of the optical axis as passing through the waveguide; and the grid resolution can be increased to be 3×5 millimeter scale near an edge of the waveguide. This approach would resemble the classical 'light-field' architecture if the grating structures had a macro-scale repetition. However, the design presented herein differs from that approach and provides a sampling basis around the eye-box, due to the uniqueness of the eye-box centroid and the size/angular coupling relationship being unique for each location of each grating structure. In this manner, not every spatial and angular sample will be measured, even when accounting for a finite grid size.

Figure 3:
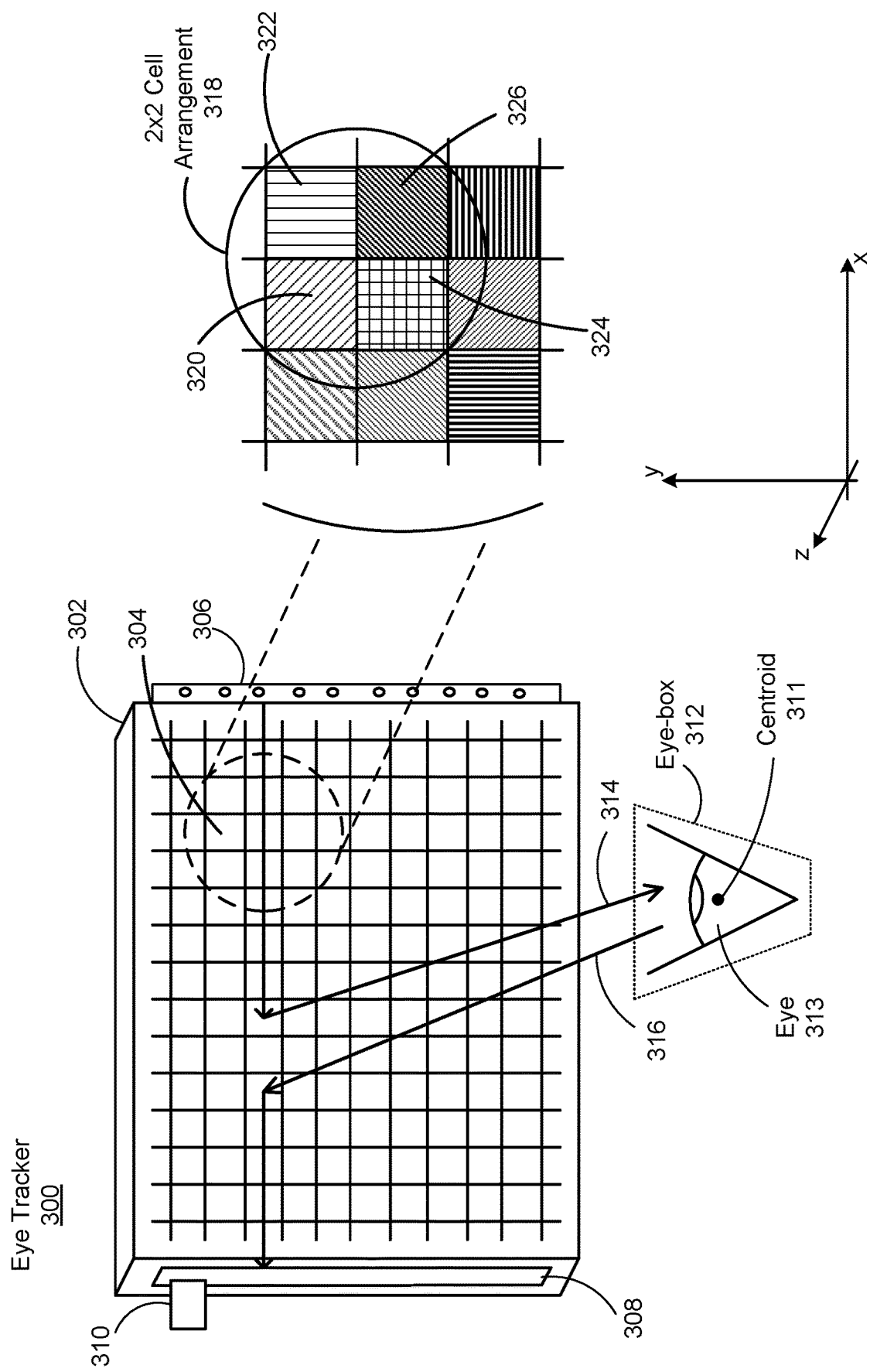
FIG. 3 is an example implementation of a waveguide integrated eye tracker based on light-field concept that may be implemented in the system in FIG. 1, in accordance with an embodiment.

FIG. 3 illustrates an example implementation of a waveguide integrated eye tracker 300 based on light-field concept, in accordance with an embodiment. The eye tracker 300 is an embodiment of the eye tracker 140 of the HMD 105 shown in FIG. 1. As illustrated in FIG. 3, the eye tracker 300 comprises a waveguide 302 populated across a surface with diffraction elements 304, an array of light sources 306, a detector array 308 coupled to the waveguide 302, and a controller 310. In some embodiments, the diffraction elements or cells 304 are Bragg grating cells, surface relief gratings, or holographic gratings. Each grating cell 304 includes a grating structure that out-couples and in-couples light at a specific angle relative to a surface normal of the grating cell. In an embodiment illustrated in FIG. 3, each diffraction element 304 in the waveguide 302 is of a rectangular shape, having a length of each linear dimension of up to approximately 1 mm. However, diffraction elements 304 populating the waveguide 302 can be of different shapes and sizes. In some embodiments (not shown in FIG. 3), the waveguide 302 is curved in one or more dimensions, rather than being simply planar as shown in FIG. 3.

In some embodiments, the waveguide 302 is populated with an array of grating cells 304 having square, rectangular, or hexagon spacing between each other. Each grating cell 304 can be of size approximately 50 μm to 5 mm on each linear dimension. Furthermore, each grating cell 304 can operate independently of other grating cells in the same row or column of the waveguide 302, along the x-axis and y-axis of the waveguide 302, respectively. In addition, each grating cell 304 can be configured to have an out-coupling angle as a function of its spatial coordinate in the waveguide 302, thus coinciding with a specific spatial region of a user's eye-box 312. In an embodiment, each grating cell 304 can be designed to have a different out-coupling angle relative to a surface normal of the grating cell. In another embodiment, each grating cell 304 can be independently optimized to provide a specific out-coupling angle relative to a surface normal of the grating cell. Based upon the position of each grating cell 304 relative to a 3D centroid 311 of the eye-box 312, the in-coupling and out-coupling angles (and, therefore, grating period and overall design of the waveguide 302) can be optimized to cover both an extent of the eye-box 312 and a field of view that could be utilized.

In some embodiments, each light source in the array of light sources 306 can be an independent source that emits light of a particular wavelength, and an array of sources forms a light bar interfaced with the waveguide 302. The light emitted from each light source in the array 306 is coupled into the waveguide 302 and propagates through the waveguide 302. The array of light sources 306 is coupled into one edge of the waveguide 302, as illustrated in FIG. 3. In some embodiments, the array of light sources 306 is a linear array of light sources that emit in the infrared (IR). A wavelength of the light emitted from the array of light sources 306 may be greater than 800 nm, preferably greater than 1,000 nm in order to avoid being noticed by the user. The light sources may be micrometer scale light-emitting diodes (LEDs) or 'micro-leds', lasers (e.g., edge-emitter lasers or vertical-cavity surface-emitting laser (VCSEL) diode lasers), and the like. In some embodiments (not shown in FIG. 3), the controller 310 is coupled to the light sources 306. The controller 310 may be configured to modulate individual light sources 306 in amplitude of emitted light, wavelength of emitted light, time, and/or duration of illumination.

As illustrated in FIG. 3, a light beam 314 emitted from one light source in the array 306 (e.g., in response to instructions received from the controller 310) can propagate through the waveguide 302 (along x axis of the waveguide 302), and can be out-coupled from the waveguide 302 via a diffraction element 304 (e.g., grating cell) at a specific out-coupling angle associated with that diffraction element 304. The light beam 314 out-coupled from the waveguide 302 is ejected towards the user's eye-box 312. A light beam 316 reflected from one surface of an eye 313 in the eye-box 312 or from the user's face is coupled back into the waveguide 302 and propagates through the waveguide 302 toward the detector array 308. The controller 310 coupled to the detector array 308 determines signal intensity of the reflected and propagated light beam 316 captured by the detector array 308.

In some embodiments, the detector array 308 is coupled into a return path of the waveguide 302 and captures reflected light beams coupled into the waveguide 302. The detector array 308 can be configured in the form of array of Y×Z pixels, where Y and Z are integers, i.e., number of pixels along y-axis and z-axis, respectively. In an embodiment, the detector array 308 is coupled to the waveguide 302 on a side of the waveguide 302 opposite of the light source array 306. In another embodiment (not shown in FIG. 3), the detector array 308 is coupled into the waveguide 302 through a beam-splitter on the same side of the waveguide 302 with the array of light sources 306. The detector array 308 may comprise silicon, Indium gallium arsenide (InGaAs), or some other material that is operational at or above 800 nm and preferably above 1,000 nm, which corresponds to a wavelength of IR light emitted from the light sources 306.

In some embodiments, the controller 310 is interfaced with the array of light sources 306 and controls emitting light from one or more light sources in the array 306. In an embodiment, the controller 310 may instruct the array of light sources 306 to emit multiple light beams simultaneously, which propagate through the waveguide 302 and are out-coupled from multiple different diffraction elements 304 toward the user's eye-box 312. Light beams reflected from various surfaces of the eye 313 in the eye-box 312 are coupled into the waveguide 302 and propagate to the detector array 308 that captures the reflected light beams. The controller 310 calculates magnitudes of the reflected light beams, and based upon a pattern of operated light sources 306 (number and position over many samples), the controller 310 can decompose the position and orientation of the eye reflection signals 316 in order to facilitate eye tracking. In this manner, the controller 310 maps a magnitude of each reflected light beam to a location of one diffraction element 304 within the waveguide 302 to calculate the return signal, i.e., a signature of magnitudes of reflected light beams, which is indicative of the features to track for the system functionality. Note that because each diffraction element 304 is associated with a particular angle—the received light also is associated with angle information (e.g., similar to that of a light field camera). Each reflected light signal originates from a light beam out-coupled from the waveguide 302 via one of the diffraction elements 304. The controller 310 determines an orientation and a position of the user's eye 313 in the eye-box 312 using the calculated signature of reflected magnitudes based on mapping between the signature of reflected magnitudes and a particular eye state parameter (orientation, position, etc.).

In some embodiments, the waveguide integrated eye tracker 300 is trained and calibrated for system tuning and learning mapping of measurements (the signatures of reflected magnitudes) into eye orientation, eye position and/or other eye state parameters. During the training and calibration procedure, a user looks at target objects presented at known positions on a display of a HMD (e.g., an electronic display of the display block 228 of the HMD 200 in FIGS. 2A-2B). The detector 308 records the measurements (the signatures of reflected magnitudes) as the user observes the presented target objects at known positions and orientations of a first eye of the user with respect to the HMD. The detector 308 estimates the position, orientation and other state parameters of the user's eye, based on the recorded measurements. As the positions, orientations and other state parameters of the user's eye are known for the presented target objects, the controller 310 can train (learn) mapping from the "sampled" measurements into estimates of eye states (positions, orientations, etc.). The controller 310 can be further configured to calibrate threshold values in relation to magnitudes of reflected light captured by the detector 308. Each threshold value is associated with an area of the waveguide 302, and a particular measurement can be deemed statistically significant when the signal value for that area of the waveguide 302 exceed the calibrated threshold value. This allows a tuning of the system to remove systematic bias due to population variance for various noisy signals. The identical calibration and training procedure can be applied for a second eye of the user. In some embodiments, the calibrations of eye trackers for both eyes are performed together to collect further information as to how the eye trackers converge or focus together during the training cycles. In addition, the user can provide further information to the system, either manually such as identifying an inter-pupillary distance (IPD), or through other tests that may involve interaction on the behalf of the user, such as pointing at objects in a scene, etc.

The controller 310 determines the orientation and/or position of the user's eye 313 based on an area on the waveguide 302 having a return intensity profile statistically above a threshold value, as determined for that area of the waveguide 302 during the calibration procedure, and the characteristic decomposition of the signal correlating to the expected return signals, also learned either directly or indirectly through the calibration. In some embodiments, the determination of the user's eye orientation and/or position in the eye-box 312 can be completed through an exhaustive search through all possible scenarios with the combination of source properties and waveguide paths. Once the eye position and/or position is acquired, orientation and/or position of the user's eye can be tracked by utilizing a smaller subset of propagation paths and source combinations, which would allow a net increase in track frequency, and/or reduced power consumption.

In some embodiments, within any 2×2 arrangement 318 of neighboring diffraction elements 304 (e.g., grating structure), each diffraction element 304 is configured to out-couple a light beam propagating through the waveguide 302 at a specific angle relative to a surface normal of that diffraction element in order to reach a unique region (location) in the user's eye-box 312. Note that an out-coupling angle is based on a specific diffraction element 304 from which a light beam is out-coupled and a wavelength of the light beam. This angular distribution of out-coupling beams of light can be mirrored for all other 2×2 cell arrangements 318 across the waveguide 302. Each diffraction element 304 (e.g., grating structure) in a 2×2 neighboring cell arrangement 318 across the waveguide 302 may have a different out-coupling angle as desired for a preferred performance, which is illustrated in FIG. 3 as a different shading of each diffraction element 304 in the 2×2 neighboring arrangement 318. In this way, it is possible to cover various eye angles and eye-box coordinates, which also shift as a function of an eye's gaze angle. For example, to cover a 10 mm cube of volume in the eye-box 312, each grating structure 320, 322, 324, or 326 that is part of any 2×2 cell arrangement 318 may be angled to a different corner in the region of the eye-box 312. Then, moving over to the next neighboring 2×2 cell arrangement (not shown in FIG. 3), different points within the region of the eye-box 312 would be aimed at through the angular out-coupling/in-coupling grating structure. In this way, the spatial movement may only be on the order of a millimeter of less, but the mapped ray angles would cover the vast majority of the eye-box 312. In some embodiments, the 2×2 cell arrangements of diffraction elements 304 illustrated in FIG. 3 can be replaced by larger cell arrangements, such as 3×3 cell arrangements, 4×4 cell arrangements, or even up to the full pattern of diffraction elements 304 being unique. This is akin to a pseudo-random or light-field optimized layout of diffraction elements across the waveguide 302, wherein each diffraction element 304 provides a different out-coupling angle for a light beam ejected from the waveguide 302.

In an illustrative embodiment, a diffraction element 320 (e.g., grating structure) within the 2×2 neighboring cell arrangement 306 is aimed, for example, at the −4.5 mm in x and y axis directions of a user's eye-box; a diffraction element 322 within the 2×2 neighboring cell arrangement 306 is aimed, for example, at the −4.5 mm in y axis direction and −1.5 mm in x axis direction of the user's eye-box; a diffraction element 324 within the 2×2 neighboring cell arrangement 306 is aimed, for example, at the −1.5 mm in y axis direction and −4.5 mm in x axis direction of the user's eye-box; and a diffraction element 326 within the 2×2 neighboring cell arrangement 306 is aimed, for example, at the 1.5 mm in x and y axis directions of the user's eye-box. In some embodiments, as discussed in more detail below, one or more other waveguides are positioned behind the waveguide 302, i.e., multiple waveguides are stacked. Each of the one or more other waveguides stacked behind the waveguide 302 has a substantially similar arrangement of diffraction elements, albeit potentially different angular constraints. Diffraction elements of the other waveguide in a 2×2 neighboring cell arrangement can be aimed at another set of four singular points in the user's eye-box (e.g., points determined by coordinates +1.5 mm and +4.5 mm in x axis, and −1.5 and −4.5 mm in y axis).

Figure 4:
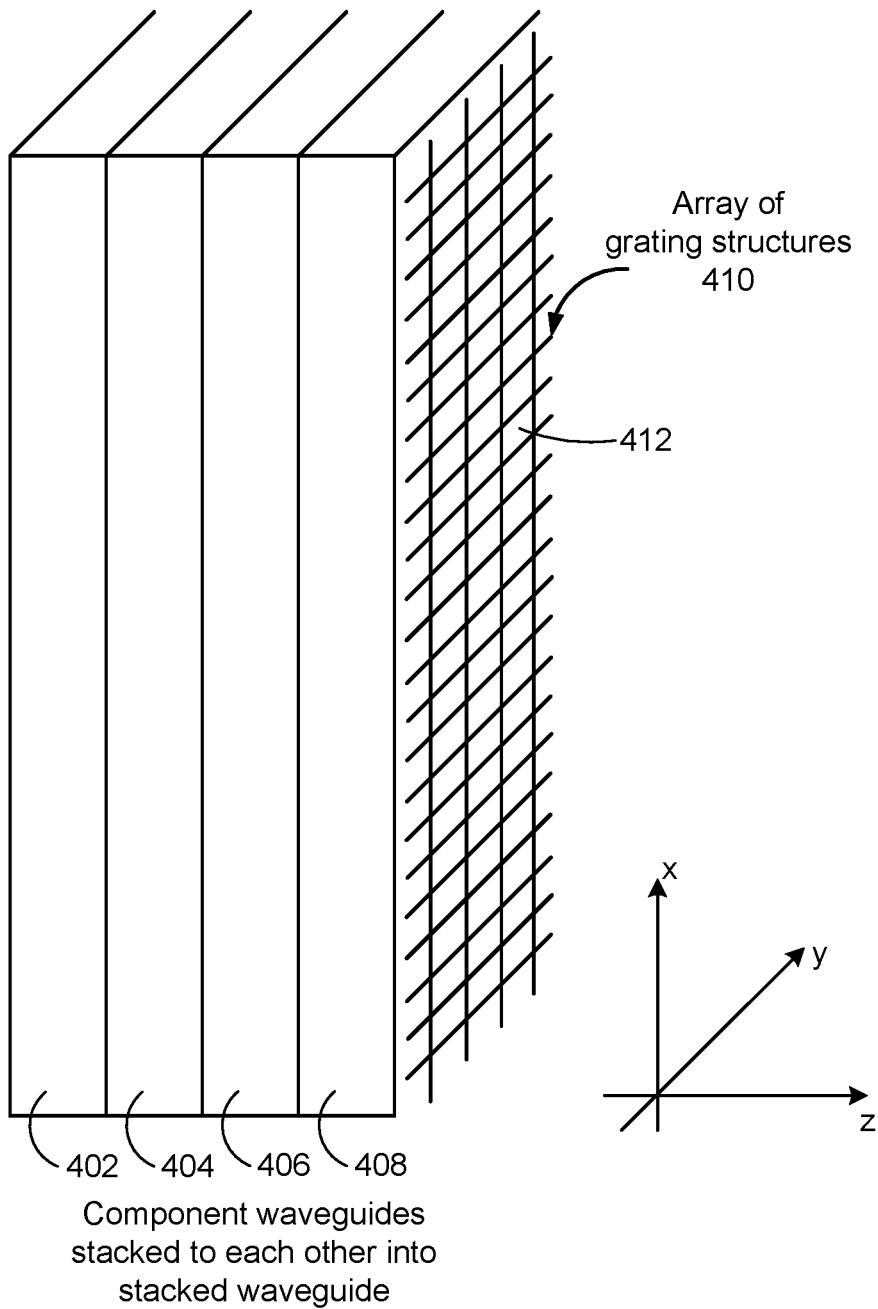
FIG. 4 is an example of a stacked waveguide comprising multiple component waveguides implemented based on light-field concept, in accordance with an embodiment.

FIG. 4 illustrates an example of a stacked waveguide 400 implemented based on the sampled light-field concept shown in FIG. 3, in accordance with an embodiment. A stacked waveguide is an aggregate of multiple individual component waveguides stacked to each other, i.e., the stacked waveguide is composed of a plurality of waveguides that are coupled together. As illustrated in FIG. 4, the stacked waveguide 400 is an aggregate of four individual component waveguides 402, 404, 406, 408. In some embodiments (not shown in FIG. 4), the waveguide 402, 404, 406, 408 are designed to be curved in one or more dimensions, rather than being simply planar as shown in FIG. 4. In some embodiments, individual component waveguides are configured such that a light being out-coupled from one component waveguide passes through another component waveguide without coupling to the other component waveguide. In other words, only the light emitted from light sources interfaced with a component waveguide couples to that component waveguide and propagates through that component waveguide until being out-coupled at a particular angle outside of a stacked waveguide toward a user's eye-box. Therefore, at the output of the stacked waveguides, there are light beams out-coupled at different angles from various component waveguides that illuminate different regions of the user's eye-box.

In an illustrative embodiment, given the boundary of −4.5 mm to +4.5 mm in both x- and y-axis of a user's eye-box (not shown in FIG. 4), four component waveguides 402, 404, 406 and 408 are stacked to each other, as illustrated in FIG. 4. Each component waveguide shown in FIG. 4 is approximately 100 μm-1,000 μm thick. For example, if each component waveguide 402-408 is 500 μm thick, the stacked waveguide 400 comprising four component waveguides 402-408 is approximately 2 mm thick. The component waveguides 402-408 can be glued or otherwise held in near contact, without substantially affecting nominal thickness of the stacked waveguide 400. By employing the stacked waveguide design illustrated in FIG. 4, angular coordinates of the user's eye-box can be distributed amongst the component waveguides 402-408. In some embodiments, an array of grating structures 410 populates each of the component waveguides 402-408. The array of grating structures 410 comprises a plurality of structures (cells) 412, wherein each grating structure 412 in the array 410 corresponds to a grating structure 304 of the waveguide 302 illustrated in FIG. 3.

The approach illustrated in FIG. 4 is based on the multiple component waveguides 402, 404, 406, 408 aggregated into the stacked waveguide 400. Implementation of an eye tracker based on a single waveguide is a preferred embodiment as being the most compact and minimum part count system design that facilitates the eye-tracking functionality. However, as discussed herein, some embodiments support design of an eye tracker where certain functions are decomposed into more than one waveguide, e.g., into the multiple component waveguides 402, 404, 406, 408 of the stacked waveguide 400, to improve other performance metrics. The stacked waveguide 400 may allow each grating structure 412 in each of the component waveguides 402, 404, 406, 408 to be potentially of a larger size compared to that when only a single waveguide is used. Instead of employing a single waveguide and further dividing the spatial extent of the single waveguide into much smaller grid segments in order to reach the sampling density needed for eye tracking, the stacked waveguide 400 with multiple component waveguides 402-408 can be used where each grating structure 410 in a waveguide layer has a larger area. The sampling density for eye tracking can be then reached by employing grating structures in subsequent waveguide layers. This approach can improve temporal sampling, if each component waveguide can operate independently. Furthermore, the stacked waveguide approach shown in FIG. 4 provides a larger signal-to-noise ratio (SNR) due to larger overall collection regions. A bigger grating structure collects more light reflected from surfaces within an eye-box (e.g., portions of a user's eye), aligns easier with other grating structures, and allows more relaxed requirements related to a user's eye-box. Furthermore, the stacked waveguide approach in FIG. 4 allows more spacing between neighboring grating structures in each of the component waveguides, which facilitates avoiding interactions and out-coupling issues, specifically by facilitating a larger break between grating structures, and potentially improved tolerances. Similarly, as for the grating structures 304 of the waveguide 302 shown in FIG. 3, each grating structure 412 in the array 410 of each of the component waveguides 402, 404, 406, 408 provides a specific angular output as a function of location of that grating structure in the stacked waveguide 400. In some embodiments, the array 410 of grating structures in each of the component waveguides 402, 404, 406, 408 is manufactured to have grating structures 412 that output/input light at particular angles based on their location in the array 410, whereas overlapping grating structures 412 in the component waveguides 402-408 have different out-coupling angles.

Figure 5:
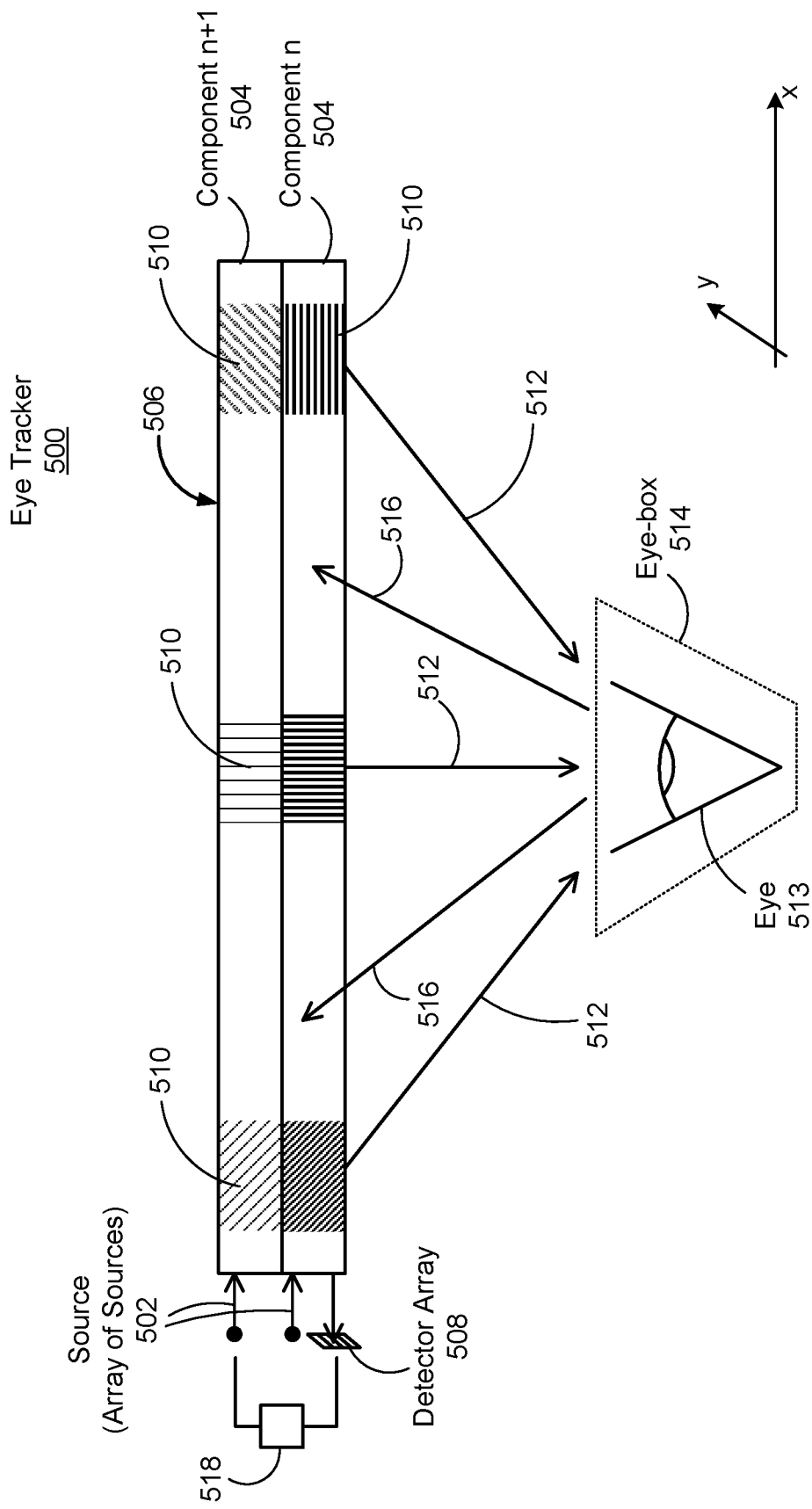
FIG. 5 is a top view of an eye tracker based on the stacked waveguide shown in FIG. 4 that may be implemented in the system in FIG. 1, in accordance with an embodiment.

FIG. 5 illustrates a top view of an eye tracker 500 based on the stacked waveguide 400 shown in FIG. 4, in accordance with an embodiment. In some embodiments, the eye tracker 500 is an embodiment of the eye tracker 140 of the HMD 105 shown in FIG. 1. In other embodiments, the eye tracker 500 is part of some other HMD. As illustrated in FIG. 5, the eye tracker 500 comprises an array of light sources 502, multiple component waveguides 504 stacked to each other into a stacked waveguide 506, and a detector array 508 coupled to the stacked waveguide 506. In some embodiments (not shown in FIG. 5), the component waveguides 504 are designed to be curved in one or more dimensions, rather than being simply planar as shown in FIG. 5. Each of the component waveguides 504 comprises a plurality of diffraction elements 510 (e.g., grating structures). Each of the component waveguides 504 can correspond to the waveguide 302 shown in FIG. 3, the component waveguides 504 can correspond to the component waveguides 402, 404, 406, 408 shown in FIG. 4, and the stacked waveguide 506 can correspond to the stacked waveguide 400 shown in FIG. 4. Each grating structure 510 has a different angular out-coupling output, which is illustrated in FIG. 5 as a different shading associated with each grating structure 510. The grating structures 510 can correspond to the grating structures 304 that populate the waveguide 302 shown in FIG. 3. Furthermore, the grating structures 510 can correspond to the grating structures 412 of the array 410 that populates each of the component waveguides 402-408 shown in FIG. 4. Thus, when the eye tracker 500 employs the stacked waveguide 506 comprising multiple component waveguides 504, a different placement of a grating array and different out-coupling angles can be utilized in each of the component waveguides 504. In this way, spatial control of grating structures placement and out-coupled angles is achieved.

As illustrated in FIG. 5, light emitted from the array of sources 502 can be out-coupled from each of the component waveguides 504 via grating structures 510 at different out-coupling angle. Light beams 512 out-coupled from the waveguides 504 are diffracted towards a user's eye-box 514. Light beams 516 reflected from surfaces within the eye-box 514 (e.g., portions of a user's eye 513) are coupled back into the component waveguides 504 and propagate through the component waveguides 504 toward the detector array 508. The controller 518 coupled to the detector array 508 determines signal intensity of the reflected and propagated light beams captured by the detector array 508.

In some embodiments, all the component waveguides 504 of the stacked waveguide 506 are coupled with a single linear array of light sources 502. Thus, all 3D locations in the eye-box 514 can be operated simultaneously, which is controlled by the controller 518 interfaced with both the array of light sources 502 and the detector array 508. The detector array 508 may comprise an M×N array of pixels, where M and N are integers corresponding to a number of component waveguides 504 and to a linear dimension of the component waveguides 504, respectively. In one embodiment, when four component waveguides 504 are stacked, M=4 and the detector array 508 comprises four linear arrays of N pixels. In this case, the detector array 508 is configured to de-couple information related to which waveguide of the four component waveguides 504 in the stacked waveguide 506 coupled in a specific light signal reflected from a surface of the eye 513 in the eye-box 514.

If the array of light sources 502 comprises a single linear array of sources coupled to the multiple stacked waveguides 504, ambiguity issues can arise in relation to cross-coupling of the emitted light beams that propagate through the multiple stacked waveguides 504. In some embodiments, as illustrated in FIG. 5, the array of light sources 502 can be implemented as an array of M×N sources, i.e., as a plurality of linear arrays of sources. In one embodiment, M=4 and each linear array of sources 502 is coupled to a different component waveguide 504. In this case, each component waveguide 504 (i.e., each component n) may be operated independently by a single linear array of 1×N light sources 502, which is controlled by the controller 518 interfaced with the array of light sources 502. In a preferred embodiment, the detector array 508 comprises a M×N array of pixels, where M is equal to or larger than a number of waveguides utilized, to facilitate isolating the cross-contamination of light beams between the component waveguides 504, i.e., each linear array of N pixels of the detector array 508 is coupled to one component waveguide 504 (i.e., one component n) of the stacked waveguide 506. In an alternative embodiment, the array of light sources 502 comprises a single linear array of sources coupled to multiple of the component waveguides 504 in the stacked waveguide 506.

Referring back to FIG. 3, in some embodiments, 2×2 neighboring cell arrangements 318 of grating structures (cells) 304 may be implemented such that grating structures 304 are of a defined smaller size. For example, instead of each grating angle/position being 1 mm×1 mm, each grating structure 304 can be implemented as a cell of size 500 μm×500 μm, i.e., approximately one half in each linear dimension. Then, instead of stacking multiple component waveguides (e.g., the multiple component waveguides 402-408 shown in FIG. 4, the multiple component waveguides 504 shown in FIG. 5), the waveguide integrated eye tracker 500 may comprise only one waveguide with a higher resolution of grating structures.

In some embodiments, an independent array of light sources 502 is not able to drive each of the multiple component waveguides 504 shown in FIG. 5. When a single linear array of light sources 502 is employed in the eye tracker 500, a layout of grating structures in each of the component waveguides 504 is controlled in order to facilitate offsetting potential ambiguity about which waveguide of the component waveguides 504 coupled in a specific light signal reflected from a surface of the eye 513 in the eye-box 514. The eye tracker 500 with a single waveguide 504 having a higher resolution of grating structures (i.e., a smaller size of grating structures) can be efficiently employed together with a single linear array of light sources 502. Note that the eye tracker 500 performs the same calibration and training procedure as discussed above in conjunction with the eye tracker 300 shown in FIG. 3.

The controller 518 controls operations of light sources in the array 502 and the detector array 508, and determines eye orientation and eye position from data obtained by the detector array 508. In some embodiments, the controller 518 instructs multiple light sources in the array 502 to emit multiple light beams that simultaneously propagate through one or more component waveguides 504. The propagated light beams are out-coupled from multiple different grating structures 510 (e.g., the light beams 512 shown in FIG. 5) toward the user's eye-box 514. Light beams reflected from surfaces of the eye 513 in the eye-box 514 (e.g., the light beams 516) are coupled into the one or more component waveguides 504 and propagate to the detector array 508 that captures the reflected light beams. The controller 518 calculates relative magnitudes of the reflected light beams captured at the detector array 508. The controller 518 further maps a magnitude of each reflected light beam to a location of one grating structure 510 within a component waveguide 504 to obtain a return signal, i.e., a signature of magnitudes of reflected light beams. Each reflected light signal may originate from a light beam out-coupled from a different grating structure 510. The controller 518 determines an orientation of the eye 513 and a position of the eye 513 in the eye-box 514 based on the calculated signature of reflected magnitudes. In one embodiment, the controller 518 determines the eye orientation and eye position based on an area having a return intensity profile both matched to a model heuristic and statistically above a threshold value determined during the calibration procedure.

FIG. 6 is a flow chart illustrating a process 600 for light-field waveguide integrated eye tracking, in accordance with an embodiment. The process 600 of FIG. 6 may be performed by the eye tracker 300 shown in FIG. 3. In alternate embodiments, the process 600 may be performed by the eye tracker 500 shown in FIG. 5. Other entities may perform some or all of the steps of the process in other embodiments. Likewise, embodiments may include different and/or additional steps, or perform the steps in different orders.

The eye-tracker 300 instructs 610 one or more light sources (e.g., the light sources 306 shown in FIG. 3 or the light sources 502 shown in FIG. 5) in the array of light sources to emit one or more light beams that propagate through one or more waveguides (e.g., the waveguide 302 or the component waveguides 504). In one embodiment, the array of light sources comprises a single linear array of light sources coupled to the one or more waveguides. In another embodiment, the array of light sources comprises a plurality of linear arrays of light sources, each linear array of the light sources coupled to a different waveguide of the one or more waveguides. The eye tracker 300 (or the eye tracker 500) is then configured to independently control (e.g., via the controller 310 or the controller 518) each linear array of light sources of the plurality of linear arrays of light sources to emit light that couples into each of the one or more waveguides.

The eye tracker 300 out couples 620 the one or more light beams towards an eye-box (e.g., the eye-box 312 or the eye-box 514) via the array of diffraction elements (e.g., grating structures) that populate the one or more waveguides. As a result, a plurality of light beams (e.g., the light beams 314 or the light beams 510) can reach the eye-box. Each light beam of the plurality of light beams is out-coupled from a different grating structure in the array of grating structures (e.g., grating structure 304 or grating structure 506), at an angle relative to a waveguide of the one or more waveguides and from a different spatial position on the waveguide. In some embodiment, light may be out-coupled at the same angle from different spatial positions across the one or more waveguides. Each out-coupled light beam may illuminate a different spatial region of the eye-box.

The eye tracker 300 in-couples 630 a plurality of light signals into one or more waveguides. In some embodiments, the in-coupling of light into a specific waveguide can be based upon a reflected/scatter signal matching a diffractive element phase function associated with that specific waveguide. In one or more embodiments, various variables of the diffractive element phase function can be optimized, such as an in-coupling angle, a wavelength, polarization efficiencies, etc. The light signals are some, or all, of the plurality of light beams that have reflected off various surfaces within the eye-box (e.g., portions of a user's eye). Each of the reflected light signals originates from a light beam out-coupled at a defined angle relative to a waveguide of the one or more waveguides and from a different spatial position on the waveguide.

The eye tracker 300 propagates 640, via the one or more waveguides, the plurality of reflected light signals to a detector (e.g., the detector array 308 or the detector array 508). Light beams reflected from various surfaces of the eye in the eye-box are coupled into the one or more waveguides as the light signals of certain intensities and propagate to the detector that captures the intensities of the reflected light beams.

The eye tracker 300 captures 650 (e.g., via the detector) the plurality of reflected light signals propagated through the one or more waveguides. In one embodiment, the detector comprises a single linear array of pixels interfaced to the one or more waveguides. In another embodiment, the detector comprises a plurality of linear arrays of pixels (i.e., rectangular array of pixels), wherein each linear array of pixels is coupled to a different waveguide of the one or more waveguides.

The eye tracker 300 calculates 660 (via the controller 310 or the controller 518), based on the captured plurality of reflected light signals, magnitudes of the plurality of reflected light signals to obtain a signature of magnitudes of the reflected light signals, i.e., a signature of converted light signals. In some embodiments, based upon a pattern of operated light sources and grating structures (e.g., number and position over multiple samples and time instants), the eye tracker 300 can decompose the position and orientation of the reflected light signals in order to facilitate eye tracking. The eye tracker 300 maps (via a controller coupled to the detector) a magnitude of each reflected light signal of the plurality of reflected light signals to a location of one grating structure in the array of grating structures within a waveguide of the one or more waveguides to calculate a return signal, i.e., the signature of reflected magnitudes, which is indicative of the features to track for the system functionality. In some embodiments, obtaining the return signal without ambiguities can be achieved through combination of multiple samples (time instants), the ability to control operation of the light sources, and careful design and layout of grid of grating structures.

The eye tracker 300 determines 670 (via the controller) an orientation and a position of a user's eye in the eye-box based on the signature of converted light signals. In one embodiment, the eye tracker 300 determines 670 the orientation and the position of the user's eye based on an area having a return intensity profile statistically above a defined threshold value. Once the orientation and the position of the user's eye are acquired, the user's eye-gaze can be tracked based on utilizing a smaller subset of combinations of light propagation paths and light sources. In some embodiments, the defined threshold value can be obtained based on the calibration procedure discussed above in conjunction with the eye tracker 300. The eye tracker 300 determines 670 the orientation and the position of the user's eye based on matching characteristics of the obtained return signal with signal characteristics obtained based on the aforementioned training procedure.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. An eye tracker comprising:
   at least one waveguide including an array of gratings;
   an array of light sources;
   a controller configured to instruct at least one of the light sources to emit at least one light beam that propagates through the at least one waveguide and is out-coupled from the at least one waveguide toward an eye via at least one of the gratings; and
   a detector configured to capture at least one light signal associated with the at least one light beam reflected from at least one surface of the eye and in-coupled by the at least one waveguide, wherein
   the controller is further configured to:
      determine light-field information for the at least one captured light signal, and
      determine a position of the eye based at least in part on the light-field information.

2. The eye tracker of claim 1, wherein the controller is further configured to:
   determine information about an intensity of the at least one captured light signal; and
   determine the position of the eye based in part on the determined information about the intensity.

3. The eye tracker of claim 1, wherein the controller is further configured to:
   determine information about an out-coupling position on the at least one waveguide for the at least one light beam; and
   determine the position of the eye based in part on the determined information about the out-coupling position.

4. The eye tracker of claim 1, wherein the controller is further configured to:
   determine information about an out-coupling angle of the at least one light beam; and
   determine the position of the eye based in part on the determined information about the out-coupling angle.

5. The eye tracker of claim 1, wherein the controller is further configured to:
   determine an area of the at least one waveguide having an intensity associated with the at least one captured light signal above a defined threshold value; and
   determine the position of the eye based in part on the determined area of the at least one waveguide.

6. The eye tracker of claim 1, wherein the controller is further configured to:
   map at least one magnitude of the at least one captured light signal to at least one location of at least one grating in the array of gratings; and
   determine the light-field information based in part on the at least one location.

7. The eye tracker of claim 1, wherein the detector comprises a plurality of linear arrays of pixels interfaced to the at least one waveguide.

8. The eye tracker of claim 7, wherein each linear array of pixels is coupled to a different waveguide of the at least one waveguide.

9. The eye tracker of claim 1, wherein the at least one reflected light beam originates from the at least one light beam out-coupled at one or more defined angles relative to the at least one waveguide and from one or more defined spatial positions on the at least one waveguide.

10. The eye tracker of claim 1, wherein the at least one light beam is out-coupled at a specific angle from a different waveguide of the at least one waveguide.

11. The eye tracker of claim 1, wherein the array of light sources comprises a plurality of linear arrays of light sources, each linear array of the light sources coupled to a different waveguide of the at least one waveguide.

12. The eye tracker of claim 11, wherein the controller is further configured to:
   independently control each linear array of light sources of the plurality of linear arrays to emit light that couples into a different waveguide of the at least one waveguide.

13. A method comprising:
   instructing at least one of light source in an array of light sources to emit at least one light beam that propagates through at least one waveguide including an array of gratings, wherein the at least one light beam is out-coupled from the at least one waveguide toward an eye via at least one of the gratings;
   capturing at least one light signal associated with the at least one light beam reflected from at least one surface of the eye and in-coupled by the at least one waveguide;
   determining light-field information for the at least one captured light signal; and
   determining a position of the eye based at least in part on the light-field information.

14. The method of claim 13, further comprising:
   determining information about an intensity of the at least one captured light signal; and
   determining the position of the eye based in part on the determined information about the intensity.

15. The method of claim 13, further comprising:
   determining information about an out-coupling position on the at least one waveguide for the at least one light beam; and
   determining the position of the eye based in part on the determined information about the out-coupling position.

16. The method of claim 13, further comprising:
   determining information about an out-coupling angle of the at least one light beam; and
   determining the position of the eye based in part on the determined information about the out-coupling angle.

17. The method of claim 13, further comprising:
   determining an area of the at least one waveguide having an intensity associated with the at least one captured light signal above a defined threshold value; and
   determining the position of the eye based in part on the determined area of the at least one waveguide.

18. The method of claim 13, further comprising:
   mapping at least one magnitude of the at least one captured light signal to at least one location of at least one grating in the array of gratings; and determining the light-field information based in part on the at least one location.

19. The method of claim 13, wherein the at least one reflected light beam originates from the at least one light beam out-coupled at one or more defined angles relative to the at least one waveguide and from one or more defined spatial positions on the at least one waveguide.

20. The method of claim 13, wherein the at least one light beam is out-coupled at a specific angle from a different waveguide of the at least one waveguide.

* * * * *